Sept. 8, 1964  J. M. BENSON  3,147,618
FLUID FLOW MEASURING APPARATUS
Filed June 8, 1961  2 Sheets-Sheet 1
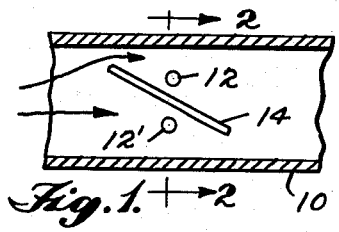
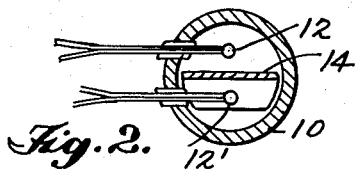
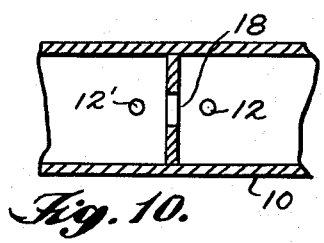
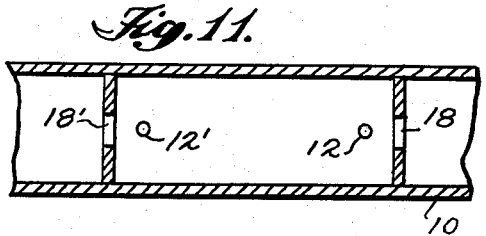
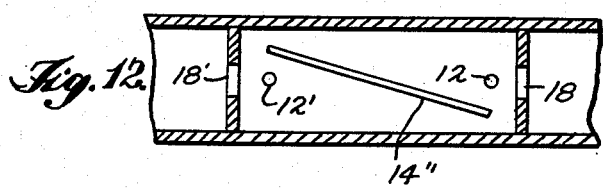
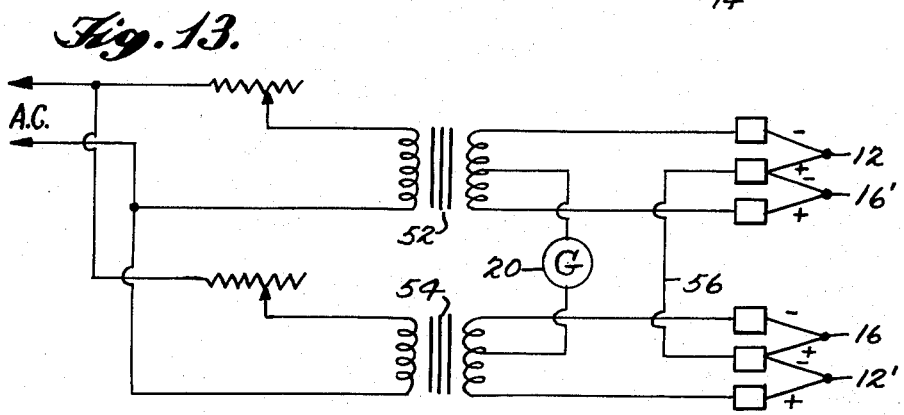
INVENTOR
JAMES M. BENSON
BY *Cushman, Darby & Cushman*
ATTORNEYS Sept. 8, 1964  J. M. BENSON  3,147,618
FLUID FLOW MEASURING APPARATUS
Filed June 8, 1961  2 Sheets—Sheet 2

INVENTOR
JAMES M. BENSON
BY Cushman, Darby & Cushman
ATTORNEYS 3,147,618
FLUID FLOW MEASURING APPARATUS
James M. Benson, Hampton, Va., assignor to Hastings-Raydist, Inc., Hampton, Va., a corporation of Virginia
Filed June 8, 1961, Ser. No. 115,651
6 Claims. (Cl. 73—204)

This invention pertains to fluid flow measuring apparatus for detecting direction of flow and the magnitude thereof.

The basic concept of the invention is to place an obstacle to fluid flow in the flow path, and in relation to this obstacle place temperature sensing elements. Due to the configuration of fluid flow past the obstacle, as the direction of flow changes the elements will be exposed to differing flow conditions. Thus, there will be a differing heat transfer relationship between the elements and the fluid which immediately surrounds them, and the temperature of the elements will be an indicator of the direction and magnitude of fluid flow.

A further concept of the invention is to provide various positional arrangements of sensing elements, brought out in more detail hereinbelow, whereby increased accuracy of measurement of both direction and magnitude of flow is achieved.

The presently preferred embodiment of the invention uses heated type thermocouple junctions as the temperature sensing elements. The cooling effect of the fluid thereupon constitutes the heat transfer relationship which is the ultimate indicator of fluid flow. Another useful embodiment is to have the temperature sensitive elements in the form of resistors the resistance of which varies with the temperature thereof. Many other embodiments will occur to those gaining an understanding of the invention and no limitations to the first mentioned embodiments is intended.

Detailed understanding of the above mentioned embodiments will now be given for purposes of illustration of the inventive features. However, the invention is not restricted thereto, but is to be determined from the appended claims.

Figure 3:
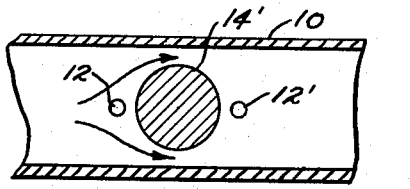
Figure 4:
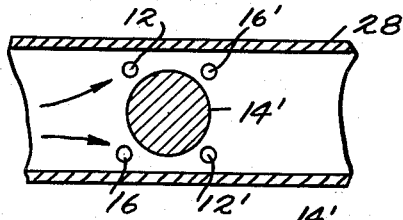
Figure 9:
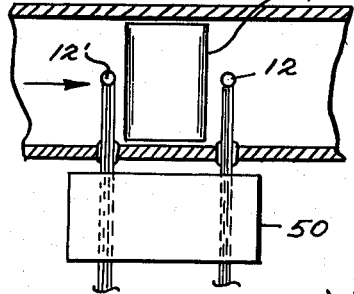
Figure 5:
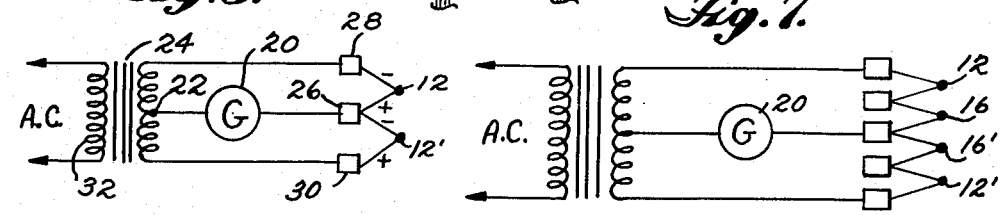
Figure 7:
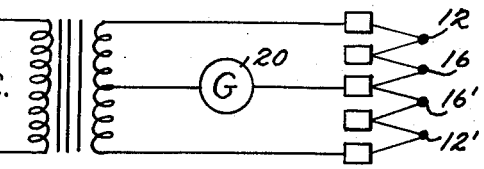
Figure 6:
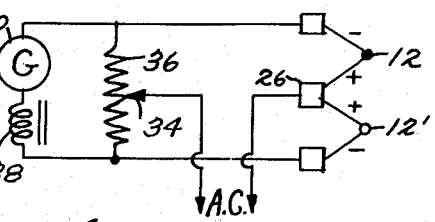
Figure 8:
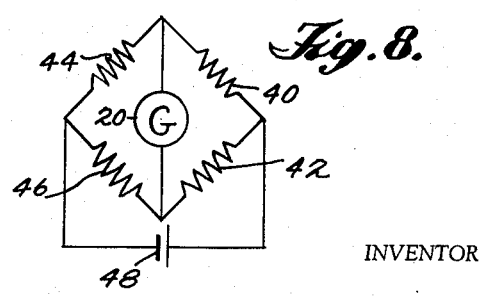

The illustrative embodiments may be best understood with reference to the accompanying drawings wherein:

FIGURE 1 shows an embodiment of the invention.
FIGURE 2 shows a sectional along line 2—2 of FIGURE 1.
FIGURE 3 shows still another embodiment of the invention within a flow confining conduit.
FIGURE 4 shows still another embodiment of the invention within a flow confining conduit.
FIGURE 5 shows one embodiment of a typical circuit for use with the invention.
FIGURE 6 shows still another embodiment of circuit for use with the invention.
FIGURE 7 shows a still further embodiment of circuit for use with the invention.
FIGURE 8 shows another embodiment of circuit for the invention, utilizing temperature responsive resistors, and
FIGURE 9 shows another embodiment of the invention, utilizing a heat sink for temperature control of heat sensing elements.
FIGURE 10 shows another embodiment of the invention within a flow conduit.
FIGURE 11 shows still another embodiment of the invention in a flow condiut.
FIGURE 12 shows a further embodiment within a flow conduit.
FIGURE 13 shows a still further circuit embodiment for use with the invention.

Referring to FIGURE 1 an embodiment of the invention for detecting the direction and magnitude of fluid flow within a confining conduit 10 is depicted. FIGURE 2 is a section taken along the lines 2—2 of FIGURE 1. Here temperature sensing elements, e.g., thermocouple junctions, 12 and 12' are shown spaced at equal distances from a plane obstacle 14 which is held by any convenient means (not shown) within the conduit at an angle to the longiutdinal axis thereof. As depicted by the flow arrows within the conduit 10 with fluid flow being from the left to the right as shown in FIGURE 1, there will be more fluid flow over elements 12' than over element 12, and less heat transfer between element 12 and the fluid can be expected than between the fluid and element 12'. In the case of flow within the confining conduit in the opposite direction, a like distribution of flow will occur, and the greater heat exchange will be with element 12 and less for 12'. Therefore, the arrangement as shown in FIGURES 1 and 2 provides information as to which of the opposite directions of flow is involved, as well as the magnitude of flow, without ambiguity.

The obstacle 14 is symmetrical with the conduit 10 in the sense that like flow patterns will be created about it for either direction of fluid flow in the conduit. The position of the elements is one of symmetry in respect to the obstacle, so that equal magnitude of flow in either direction will result in similar condition of heat exchange at the "upstream" and "downstream" elements. However, in all cases there will be a different amount of heat exchange between the up and downstream elements due to fluid movement.

FIGURE 3 shows a case of flow within a confining conduit 10, except the obstacle is shown to be of circular cross-section, preferably a cylinder, along an axis or diameter perpendicular to the axis of the confining conduit and therefore the path of general fluid flow. The obstacle here is designed 14' and could be either a sphere or a cylinder, preferably the latter.

FIGURE 4 shows a case within a confining conduit similar to FIGURES 1 and 3, except that four temperature sensing elements 12, 16, 12', 16' are employed so as to prevent any one being in a region of stagnation due to being immediately upstream of fluid flow, as is possible with the embodiment shown in FIGURE 3. Ambiguities may thus be resolved, particularly if stagnation effect on the upstream side should result in the same amount of heat transfer between the element and fluid as would occur on the downstream side. However, such condition is unlikely to occur with most forms of obstacles.

Still further obstacle-element dispositions are shown in FIGURES 10, 11 and 12. In FIGURE 10 the circular orifice 18 cause a jet of accelerated flow downstream of it, whereby the downstream element would be cooled more than the upstream one. FIGURE 11 uses two orifices 18 and 18' with the two elements between same. As shown in FIGURE 12, orifices 18 and 18' are used in conjunction with a further obstacle 14' and like 14 in FIGURE 3, to increase the flow over the upstream element. Various other types of obstacle systems will occur to those reading this specification, now that the theory is made clear.

Thus far this description has proceeded with reference to the fluid flow obstacle, the position of temperature determining elements with respect thereof, and to the relative position of a surrounding conduit which determines the general path of flow of fluid. Attention will now be given to means for ascertaining the temperature of the elements.

The type of temperature sensing element which is presently the most preferred, is the thermocouple junction type. A thermocouple junction is capable of detecting and measuring temperature, by reason of the well known fact that a junction between two dissimilar materials generates an electrical current, the magnitude of which is a function of the temperature of the junction. The most preferred form of thermocouple circuit is of the type described, for example, in the prior United States patents of Charles E. Hastings, 2,540,822 and 2,745,283, the latter assigned to the assignee of the present invention. In view of the disclosures of those patents, it is believed sufficient to explain herein, as may be further understood by reference to FIGURE 5, and with regard to the figures heretofore explained, two thermocouple junctions 12 and 12' may be arranged in series so that their voltages are additive, and a galvanometer or other current measuring instrument 20 is connected to carry a current which depends upon the relative temperatures of the elements 12 and 12'. In FIGURE 5 the galvanometer 20 is connected between the mid-tap 22 of the secondary of a transformer 24, and cold junction 26 between the hot junctions 12 and 12'. The "one-half" cold junctions 28 and 30 of the thermocouples are connected to the ends of the aforesaid secondary of transformer 24. The primary winding 32 of the transformer 24 may be connected to a source of alternating current. In operation, if the junctions 12 and 12' are at the same temperature, the voltages generated thereby will be equal and under these conditions no current will flow in the galvanometer 20. However, any difference in the temperatures of junctions 12 and 12' will cause a current to flow through galvanometer 20. This current will reverse if the relative high and low temperatures of the junctions 12 and 12' reverse. The alternating current generated in the secondary of transformer 24 causes alternating current to flow through the thermocouple junctions 12 and 12' and imparts heat thereto. However, alternating current does not flow through the galvanometer due to the fact that the mid-tap of the secondary winding of the transformer and the central cold junctions 26 are at like potentials with respect to the alternating current circuit. It should now be apparent that if the junctions 12 and 12' of FIGURE 5 are the temperature sensing elements 12 and 12' of any of the circuits thus far described, any difference between the temperatures of elements 12 and 12' will be indicated by the magnitude of the reading on galvanometer 20, and the direction of reading of the galvanometer from a reference zero point will show which of elements 12 and 12' is at a higher temperature.

It will be appreciated that for a single thermocouple junction to be used, the heating principle can still be employed, by use of a suitable circuit that will block alternating current flow through the galvanometer (to the extent that same would affect its operation) and the direct current due to the generation of voltage in the junction can be measured.

FIGURE 6 shows a circuit similar to that of FIGURE 5, but wherein alternating current is supplied by connection between the central cold junction 26 and a movable tap 34 on a resistor 36 connected between the two "one-half" cold junctions. Adjustment of the movable tap 34 will serve to balance out any static or quiescent output from the junctions 12 and 12'. In FIGURE 6, the galvanometer 20 is protected against alternating current flow therein by the inductance 38.

With reference to the placement of four temperature sensing elements designated 12, 12' and 16, 16', in FIGURE 4, a suitable circuit therefor is shown in FIGURE 7, wherein the junctions 12 and 16 are connected in series in one loop feeding the galvanometer, and the junctions 16' and 12' are connected in series in the other loop feeding the galvanometer 20. In this way the average temperature of the upstream elements 12 and 16 is compared to the average value of the downstream elements 16' and 12' (assuming flow from left to right as shown in FIGURE 4). The placement of temperature sensing elements as shown in FIGURE 4, avoids any one of them being in a zone of stagnation directly upstream of the cylindrical obstacle.

Another general embodiment of temperature sensing element is to have same in the form of a resistor, the resistance of which varies as a function of its temperature. Thus in respect to any of the embodiments described hereinabove, a thermocouple junction could be replaced by such a resistor. As shown in FIGURE 8, wherein one temperature sensing resistor is designated by reference character 40 and the other by reference character 42, same may be used in a bridge circuit otherwise comprising known companion resistors 44 and 46, and with galvanometer 20 connected between the junctions of resistors 40 and 44 at one side and the junction between resistors 42 and 46 at the other. A suitable source of electric current such as batteries 48 may then be connected across the remaining two junctions of the bridge thus formed. The reading of the galvanometer as to the direction, will indicate which of resistors 40 and 44 is at a higher temperature, and the magnitude of the galvanometer reading will indicate the difference in temperatures thereof. It will be appreciated that the current flowing through the resistors 40 and 44 has the effect of imparting heat thereto, with the result that there can be differing amounts of heat transfer betwen respective resistors and the surrounding fluid, just as in the case of the heated thermocouple junctions described hereinabove.

While the foregoing discussion has been directed to types of heat sensing elements wherein heat is imparted thereto, it should also be understood that in cases where the velocity of the flow of fluid is so great as to create zones where the piling up or compression of fluid causes a significant adiabatic temperature change, then temperature sensing elements to which heat is not independently imparted may be utilized.

While possibly the first concept to occur to one is that of imparting heat to a temperature sensing element to tend to maintain its temperature constant against cooling effects of a cooler fluid, nevertheless the same principles apply where the fluid is more hot than the element. Here the element more exposed to fluid flow will become more hot (such as element 12' in FIGURE 1), and the less exposed element (such as element 12 in FIGURE 1) will undergo less rise in temperature. There is also the related concept of having the elements coupled to a heat sink, relative to which the fluid is more hot, whereby without imparting any heat to the element, nevertheless the apparatus will function because the element more exposed to the fluid will rise in temperature to a value greater than experienced by the other element. This is due to the greater temperature drop between the element and sink—due in turn to the greater heat flow to the sink. FIGURE 9 illustrates the case of a massive block of metal designated by reference character 50 serving as a heat sink by virtue of the supporting leads from elements 12 and 12' extending thereinto. In operation, the heat sink would be maintained at some temperature $T_0$ and the fluid would be known to be at a greater temperature $T_1$.

FIGURE 13 shows still another type of circuit which can be used to advantage where four elements are employed, as, for example, in FIGURE 4. Here, the two pairs of elements 12, 16 and 12', 16' are heated independently, through transformers 52 and 54 having adjustable input circuits, to allow for variations in fabrication of the equipment. The indicating instrument 20 is connected between the mid-taps of the two transformer secondaries, and the common connections of the two pairs of elements are connected together by the conductor 56. Thus any A.C. unbalance signals are prevented from appearing at the instrument 20 when temperature variations may cause unsymmetrical variation in resistance of the individual elements.

It is to be understood that since at least two heat sensing elements are utilized, it is not necessary to independently measure the temperature of the fluid. This is true because at least two heat sensing elements are employed in positions of symmetry with respect to an obstacle—and in positions of symmetry with respect to a surrounding conduit which determines the fluid flow along a given axis, wherefore temperature effects of the fluid will cancel out and the readings of the measuring equipment will be independent thereof.

It is to be understood that the detailed descriptions of illustrative embodiments given hereinabove are intended only for purposes of conveying a clear understanding of the underlying principles and scope of the invention is to be determined from the appended claims.

What is claimed is:

1. Apparatus for detecting the direction and magnitude of fluid flow with respect to a given axis of flow comprising, a conduit for defining said axis of flow, means forming a fluid flow obstacle placed within said conduit on said axis of flow and presenting like contours to flow about said obstacle in either direction along said axis of flow, at least two temperature sensing elements, means for tending to maintain the temperature of each element at a predetermined level, and means positioning said elements symmetrically with respect to said obstacle means and said axis of flow so that for flow along said axis in one direction one element will be at a temperature greater than the other element, due to different amount of heat transfer between each element and the fluid surrounding it, and vice-versa for flow along the axis in the opposite direction, the means for tending to maintain the temperature of the element including structure supporting the element and in heat transfer relationship therewith.

2. Apparatus for detecting the direction and magnitude of fluid flow with respect to a given axis of flow comprising, a conduit for defining said axis of flow, means forming a fluid flow obstacle placed within said conduit on said axis of flow and presenting like contours to flow about said obstacle in either direction along said axis of flow, at least two temperature sensing elements, means for tending to maintain the temperature of each element at a predetermined level, and means positioning said elements symmetrically with respect to said obstacle means and said axis of flow so that for flow along said axis in one direction one element will be at a temperature greater than the other element, due to different amount of heat transfer between each element and the fluid surrounding it, and vice-versa for flow along the axis in the opposite direction, and wherein the obstacle is a flat plate member inclined to the axis of the flow and which comprises two of said elements positioned on opposite sides of said plate.

3. Apparatus for detecting the direction and magnitude of fluid flow with respect to a given axis of flow comprising, a conduit for defining said axis of flow, means forming a fluid flow obstacle placed within said conduit on said axis of flow and presenting like contours to flow about said obstacle in either direction along said axis of flow, at least two temperature sensing elements, means for tending to maintain the temperature of each element at a predetermined level, and means positioning said elements symmetrically with respect to said obstacle means and said axis of flow so that for flow along said axis in one direction one element will be at a temperature greater than the other element, due to different amount of heat transfer between each element and the fluid surrounding it, and vice-versa for flow along the axis in the opposite direction, and wherein the obstacle is a member circular in cross-section, and which comprises at least four of said elements, positioned at predetermined points about said member, whereby for any given direction of fluid flow at least two of said elements are removed from a fluid flow stagnation zone.

4. Apparatus for detecting the direction and magnitude of fluid flow with respect to a given axis of flow comprising, a conduit for defining said axis of flow, means forming a fluid flow obstacle placed within said conduit on said axis of flow and presenting like contours to flow about said obstacle in either direction along said axis of flow, at least two temperature sensing elements, means for tending to maintain the temperature of each element at a predetermined level, and means positioning said elements symmetrically with respect to said obstacle means and said axis of flow so that for flow along said axis in one direction one element will be at a temperature greater than the other element, due to different amount of heat transfer between each element and the fluid surrounding it, and vice-versa for flow along the axis in the opposite direction, and wherein the elements are positioned with respect to the obstacle means so as to be removed from fluid flow stagnation zones created as the fluid flows about said obstacle, wherein the obstacle means is a cylinder and the elements are positioned adjacent the cylinder, on opposite sides thereof, and each on a radius of said cylinder which lies at a given acute angle to said axis of flow.

5. Apparatus as in claim 4 wherein the apparatus comprises four elements positioned on radii lying in a given plane and both having a like acute angle to said axis.

6. Apparatus for detecting the direction and magnitude of fluid flow with respect to a given axis of flow comprising, a conduit for defining said axis of flow, means forming a fluid flow obstacle placed within said conduit on said axis of flow and presenting like contours to flow about said obstacle in either direction along said axis of flow, at least two temperature sensing elements, means for tending to maintain the temperature of each element at a predetermined level, and means positioning said elements symmetrically with respect to said obstacle means and said axis of flow so that for flow along said axis in one direction one element will be at a temperature greater than the other element, due to different amount of heat transfer between each element and the fluid surrounding it, and vice-versa for flow along the axis in the opposite direction, and wherein said elements are thermocouple junctions and the apparatus includes means to heat said junctions.

References Cited in the file of this patent

UNITED STATES PATENTS

| | | |
|---|---|---|
| 2,431,241 | Godsey | Nov. 18, 1947 |
| 2,458,331 | Borell | Jan. 4, 1949 |
| 2,594,618 | Booth | Apr. 29, 1952 |
| 2,647,401 | Hathaway | Aug. 4, 1953 |
| 2,799,165 | Varvel | July 16, 1957 |

FOREIGN PATENTS

| | | |
|---|---|---|
| 888,695 | France | Sept. 13, 1943 |